United States Patent [19]

Soule, Jr.

[11] 4,031,360
[45] June 21, 1977

[54] ELECTRONIC READ OUT TAPE MEASURE

[75] Inventor: Gustave H. Soule, Jr., Franklin, La.

[73] Assignee: The Raymond Lee Organization, Inc., New York, N.Y.; a part interest

[22] Filed: Nov. 17, 1975

[21] Appl. No.: 632,529

[52] U.S. Cl. .............................. 235/92 DN; 33/139; 235/92 MP; 235/92 R

[51] Int. Cl.² ...................... G06M 3/14; G01B 3/12

[58] Field of Search ................ 33/139, 140, 137 R, 33/125 R; 235/92 DN, 92 MP, 92 EV, 103

[56] References Cited

UNITED STATES PATENTS

| | | | |
|---|---|---|---|
| 2,484,817 | 10/1949 | De Armono | 33/139 X |
| 2,854,753 | 10/1958 | Caparros | 33/139 |
| 3,271,564 | 9/1966 | Rosenfeld et al. | 33/140 |
| 3,639,995 | 2/1972 | Gardner | 33/139 X |
| 3,739,276 | 6/1973 | Dornberger | 235/92 DN |
| 3,943,783 | 3/1976 | Boyer | 33/139 X |

Primary Examiner—Joseph M. Thesz
Attorney, Agent, or Firm—Howard I. Podell

[57] ABSTRACT

A tape measure which indicates by electronic digital display the length of extended tape. The housing of the unit includes a tape mounted on a spring-biased reel, and an electronic digital display unit connected to an electronic calculator. The electronic calculator is wired to add fixed multiples of length as the tape is pulled out of the housing and to subtract fixed multiples of length as the tape is drawn back into the housing so that the digital display indicates the total extended length of tape.

1 Claim, 4 Drawing Figures

ELECTRONIC READ OUT TAPE MEASURE

SUMMARY OF THE INVENTION

My invention is a tape measure which indicates by electronic digital display the length of extended tape. The housing of the unit includes a tape mounted on a spring-biased reel, and an electronic digital display unit connected to an electronic calculator. The electronic calculator is wired to add fixed multiples of length as the tape is pulled out of the housing and to subtract fixed multiples of length as the tape is drawn back into the housing so that the digital display indicates the total extended length of tape.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
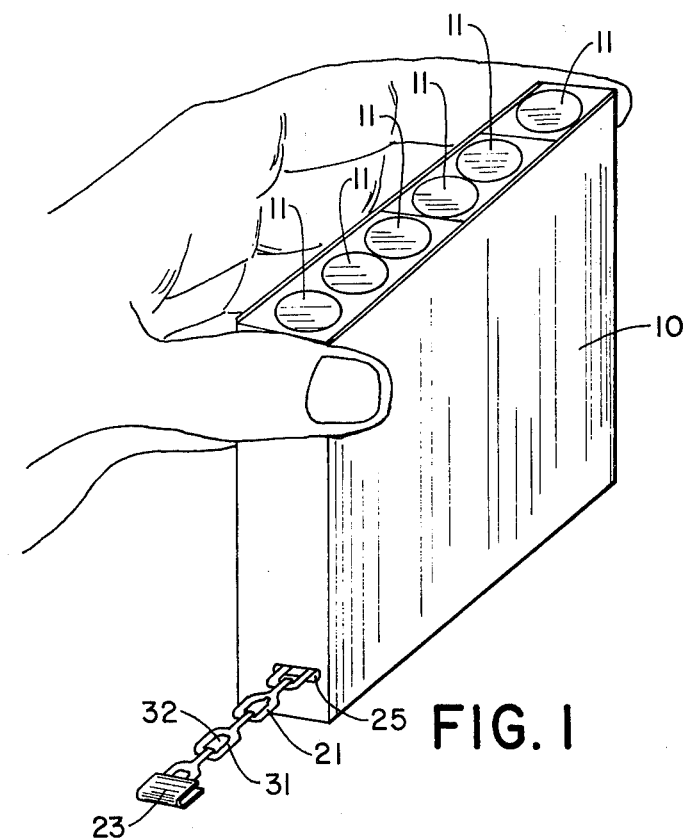
FIG. 1 is a perspective view of the invention in use.
Figure 2:
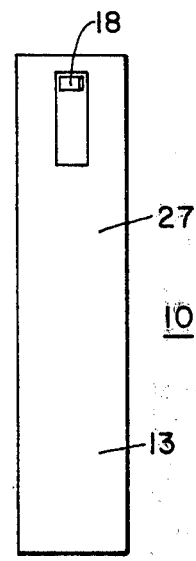
FIG. 2 is an end view of the invention.
Figure 3:
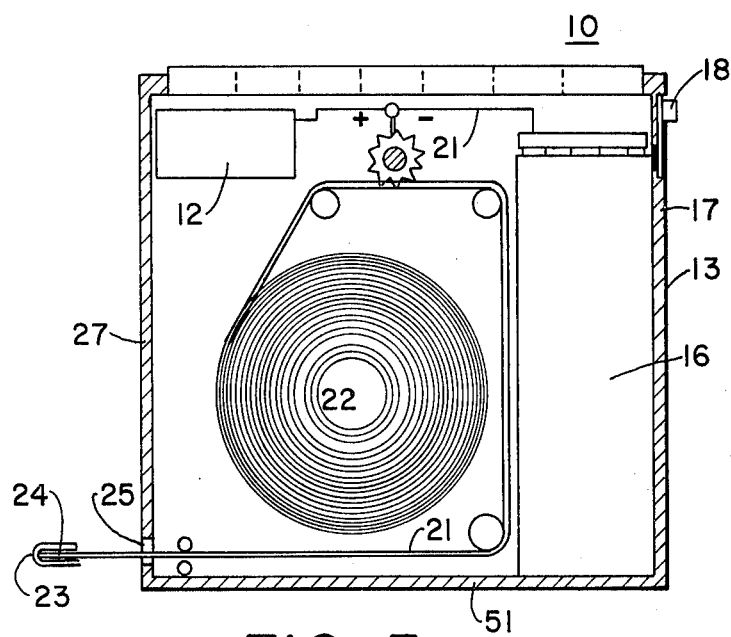
FIG. 3 is a side sectional view of the invention.
Figure 4:
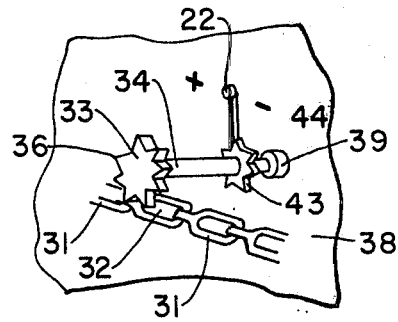
FIG. 4 is a perspective view of the rachet wheel counter unit of the invention.

Turning now descriptively to the drawings, in which similar reference characters denote similar elements throughout the several views, FIGS. 1-3 illustrate the electronic tape measure 10 in which an electronic digital display unit 11 is mounted. Display unit 11 may consist of a bank of light emitting diodes or liquid crystal units which display unit 11 is connected to an electronic calculator unit 12 inside the housing 13 of the device 10, so as to display the numerical total of a sum computed by the calculator unit 12.

A battery 16 is housed inside the device 10 and connected through a switch 18 mounted in an external wall 17 of the housing 13 to the calculator unit 12 by cable 21. A double pole, three position, momentary contact switch 22 is connected by cable 21 to computer unit 12 with switch 22 in a first neutral position disconnected. In a second position, the switch 22 connects a positive pulse of electricity to the calculator 12 and in a third position the switch 22 connects a negative pulse of electricity to the calculator unit 12.

The sum displayed by electronic display unit 11 as totaled by calculator unit is the sum of the positive pulses received from the switch 22 minus the sum of the negative pulses, and the read-out may be set to register in units of feet, inches and tenths of an inch or meters, centimeters and millimeters as programmed in the calculator unit 12.

Tape 21 is wound on reel 22 inside housing 13 with reel 22 spring-biased to retract the tape completely into the housing. An end fitting 23 on the free end 24 of the tape is of a larger dimension than the slot 25 in the housing wall 27 through which the tape 21 passes so as to prevent the end 24 of the tape from being drawn into the housing. Tape 21 is formed of links 31 fitted to each other, with each link perforated with a through hole 32. A sprocket gear 33 is mounted in housing 13 on a rotatable shaft 34 that is mounted in a bearing 39 extending from a housing wall 38, so that the teeth 36 of gear 33 mesh with the perforations 32 of tape links 31 to rotate gear 33 proportionately to the travel of tape 21 in a direction relative to the direction of travel of tape 21. Shaft 34 is fixed to a pinion gear 43, with a spring arm member 44 of switch 22 meshed with the teeth 44 of gear 43 so as to move the contacts of switch 22 from a first neutral position to either a said second position or a said third position each time a tooth 44 of gear 43 revolves past switch arm member 44, depending on the direction of rotation of pinion gear 43.

Manually pulling out of tape 21 from housing 13 with main switch 18 in the ON position results in a series of positive pulses from switch 22 to calculator 12, with complete retraction of the tape 21 resulting in switch 22 transmitting an equal number of negative pulses so that when the tape is extended the read out 11 electronically displays the total sum of length units of extended tape and with the tape retracted, the read out 11 electronically displays a zero reading. The length sum displayed by read out 11 may be increased by an arbitrary constant which is the length of wall 51 of housing 13 so that the read out includes the sum of the length of the housing and extended tape.

By momentarily shutting switch 18 OFF after tape 21 is partially extended, the sum displayed by read out 11 is returned to the initial reading and further extension or retraction of the tape with respect to housing 13 will indicate on read out 11 only the amount of such further movement after switch 18 has been turned ON, including any arbitrary constant.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A tape measure device incorporating a flexible tape mounted on a spring-biased rotatable reel in a housing, said housing enclosing an electric calculator connected to an electronic digital display unit, with said calculator connected to means to sense the length of tape extended out of said housing in terms of a total of discrete units, and with said calculator incorporating means to cause the electronic digital display unit to display the said total of discrete units, said tape fabricated of joined individual links, with each link perforated by a through hole of a size to fit over a tooth of a sprocket wheel rotatably mounted in said housing, with the links of said tape engaged about the sprocket wheel so as to cause the sprocket wheel to rotate in direct proportion to the travel of said tape into or out of said housing, said sprocket wheel rotatably linked to switching means which transmit pulses of electrical current to said calculator in response to the rotation of said sprocket wheels, the number of said pulses being directly proportional to the degree of rotation of the sprocket wheel and the polarity of said pulses being responsive to the direction of rotation of said sprocket wheel, such that the calculator controls the elctronic digital display unit to display a numeral representing a length of tape extended out of the housing, said numeral being the sum of pulses of a first polarity minus the sum of pulses of the reverse polarity.

* * * * *